May 7, 1929.                L. LIEBMAN                1,712,443
                          SOLDERING MACHINE
                       Filed March 21, 1928        2 Sheets-Sheet 1

WITNESSES

INVENTOR
Louis Liebman
BY
ATTORNEY

May 7, 1929.  L. LIEBMAN  1,712,443
SOLDERING MACHINE
Filed March 21, 1928  2 Sheets-Sheet 2

WITNESSES

INVENTOR
Louis Liebman
BY
ATTORNEY

Patented May 7, 1929.

1,712,443

UNITED STATES PATENT OFFICE.

LOUIS LIEBMAN, OF NEW YORK, N. Y.

SOLDERING MACHINE.

Application filed March 21, 1928. Serial No. 263,547.

The present invention is concerned with the provision of a soldering machine which may have a wide range of utility, but which is peculiarly adapted and primarily intended for soldering the corners of metal doors, and generally similar articles.

The conventional practice heretofore has been to assemble the relatively massive and heavy doors, and then solder the joints at the corners of the doors by dipping them into— first, an acid bath, and then a solder bath, the particular type of solder and acid depending of course on the particular type of metal used in the door.

Due to the weight of the doors and the fact that they are cumbersome and unwieldy to handle, the soldering operation has been a difficult one, there being always the possibility of dropping the door, splashing the solder, etc. Furthermore, no efficient door handling mechanism has been devised which would permit the doors to be conveniently mechanically dipped.

In accordance with the present invention, I overcome all of the above noted difficulties and provide a soldering machine equipped with a work holder upon which a door or the like may be removably held. This work holder is substantially universally adjustable to permit the door to be tilted and held at any angle, and also to be bodily shifted in any direction. Associated with the holder are a pair of pots, one adapted to contain acid and the other adapted to contain solder. With the door securely held on the table, the pots may be elevated to immerse the door corners in the liquid contained in the pots. Thus, in use, a door may be strapped to a table or work holder, locked in suitable position above the acid pot, and the acid pot moved upwardly to immerse the door corner. The door is then bodily shifted over the solder pot, and the latter moved upwardly to immerse the door joint.

Features of the invention are the unique mechanism used for adjustably supporting the work holder, for manipulating the work holder, and for manipulating the movable pots.

Other objects of the invention are to provide a soldering apparatus of this character which may be conveniently manually manipulated, which will be of simple, practical construction, rugged, durable and efficient in use, and well suited to the requirements of economical manufacture.

With the above noted and other objects in view, the invention consists in certain novel features of constructions and combinations and arrangements of parts as will be more fully hereinafter set forth and pointed out in the claims. The invention may be more fully understood from the following description in connection with the accompanying drawings, wherein—

Fig. 4 is a reduced plan view showing the manner in which the work is supported on the table.

Figure 1:
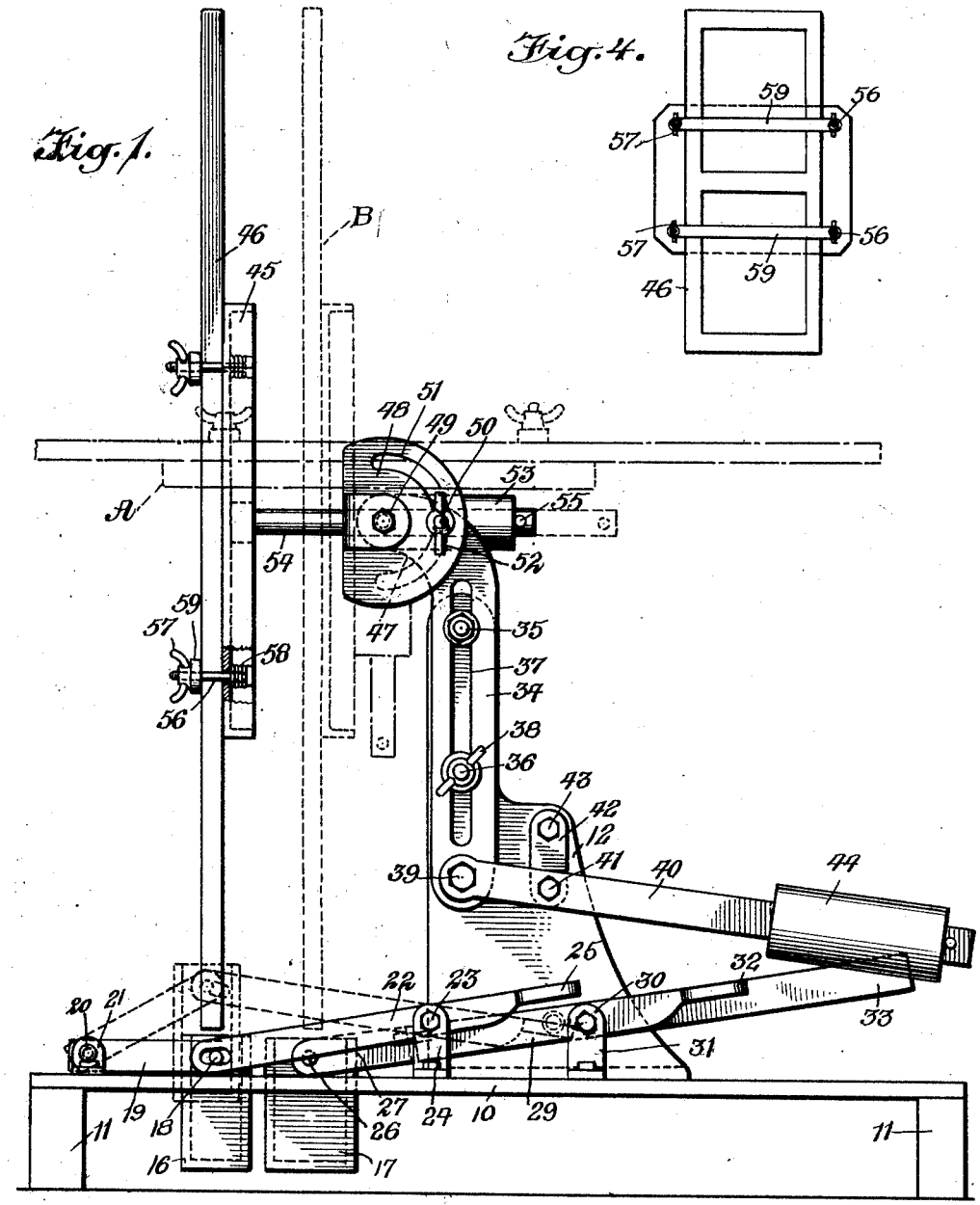
Fig. 1 is a side elevational view of a machine embodying the present invention, the dotted lines indicating the elevated position of one of the troughs or pots and also indicating two alternate positions of the table and work.
Figure 2:
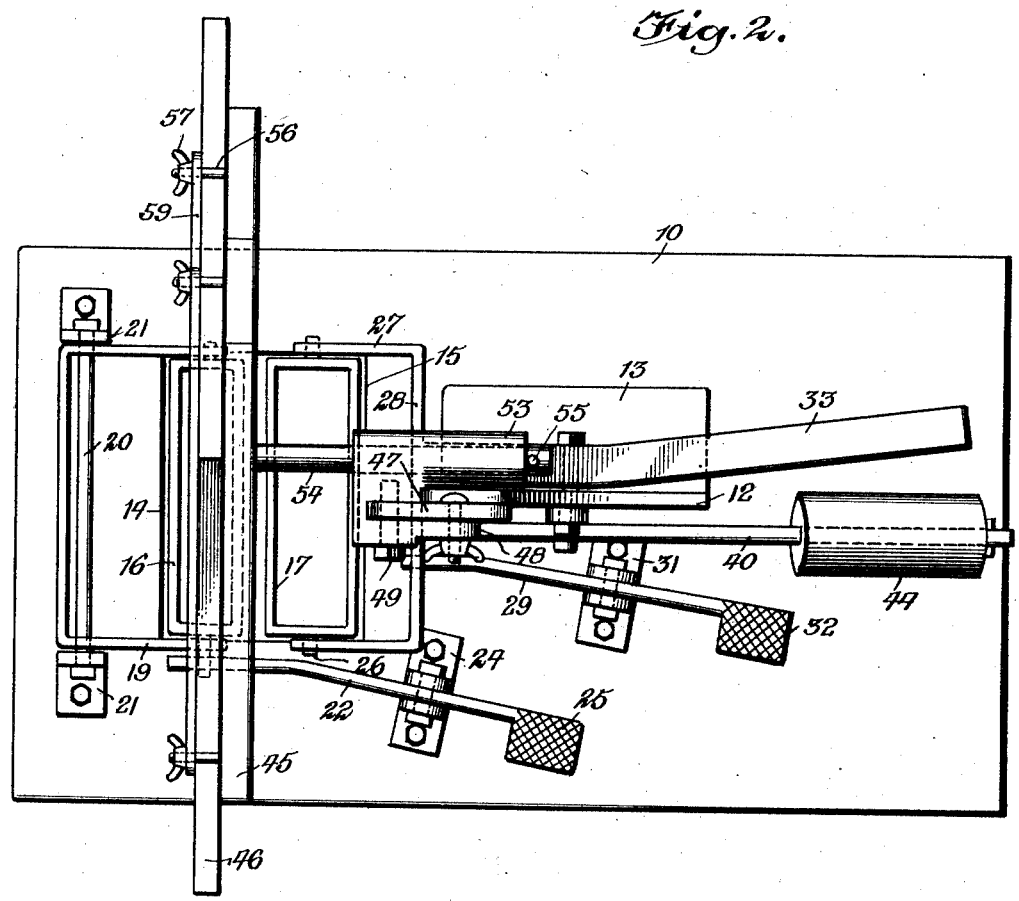
Fig. 2 is a top plan view of Fig. 1.

In the drawings I have used the reference numeral 10 to designate a base or platform supported above the floor and on legs or blocks 11. Rising vertically from the platform 10 is a frame plate 12, the lower end of which is turned over to provide a foot 13 secured in any suitable manner to the platform. Openings 14 and 15 in the platform 10 serve to accommodate pots or troughs 16, 17 which contain solder and acid baths respectively. The trough 16 carries trunnions 18 which pass through the apertured extremities of the arms of a yoke 19, the intermediate portion of this yoke being pivotally connected to a transverse shaft 20 mounted in suitable bearing brackets 21 anchored to the platform. One of the trunnions 18 projects through one of the yoke arms 19 into the slotted end of a lever 22 fulcrumed at 23 intermediate its ends between brackets 24 secured to the base. The lever 22 is normally held in the full line position of Fig. 1 by the weight of the pot 16. The free end of the lever however, is provided with a pedal portion 25, which, when depressed, elevates the pot 16 to the dotted line position of Fig. 1. The pot 17 carries trunnions 26 received in the arms 27 of a yoke 28, this yoke being directly connected to one end of a lever 29 fulcrumed at 30 in brackets 31, and carrying a pedal 32 at its free end. The pedals 25 and 32 are arranged relatively close together, so that the operator may conveniently step upon either of them while conveniently manipulating the work-table adjustments.

The yoke 28 is preferably connected to a counter balancing arm 33 fulcrumed to the frame plate which assists in lifting the weight of the pot 17.

A longitudinally slotted standard 34 is slidable on the vertical frame plate 12. A pair of studs 35 and 36 project from the frame plate into the slot 37 of the standard, and at least one of the studs 36 carries a clamping nut or equivalent device 38 which may be used to jam the standard against the frame plate and lock the standard against sliding movement. Pivotally connected at 39 to the lower end of the standard 37 is a lever 40 fulcrumed intermediate its ends at 41 on the lower end of a swinging link 42 pivotally hung at 43 on the frame plate 12. The free end of the lever 40 is equipped with a counter balance 44 which may be slidably adjusted in any convenient or conventional manner (not shown). The weight 44 is adapted to counter balance the weight of the work-table 45, and the work, such as a door 46 which is carried by the table. The upper end of the standard 37 curves laterally as at 47 toward the pots 16 and 17, and a plate 48 is pivotally connected to the upper laterally extended end of the standard as by a pivot bolt 49. Means is provided for locking the plate 48 in any desired position of pivotal adjustment, such means being illustrated as a stud 50 fixed to the standard 34 and working in an arcuate slot 51 in the plate 48. This stud 50 is encircled by a conventional clamping nut 52 which may serve to bind the plate against the standard and hold the plate against pivotal movement.

Rigidly secured in any desired manner to the plate 48, and if desired, integral therewith, is a sleeve member 53 in which a shaft 54 is rotatably and slidably mounted. This shaft at one end is provided with a cross pin 55 to prevent it from pulling through the sleeve 53, and at its other end is rigidly secured to the work supporting table 45.

Any suitable means may be utilized for clamping the work to the table. This means is most clearly seen in Fig. 4, wherein it will be noted that the table is slightly wider than the door 46 and laterally of the door mounts pairs of headed bolts 56 having threaded ends which receive clamping nuts 57. The bolts project through the table, and interposed between the bolt heads and the back of the table are coiled expansion springs 58 so that the work 46 is always yieldingly held against the table when the bolts are tightened to press transverse clamping strips or bars 59 against the work. These bars extend transversely of the work, are received on the bolts 57 and yieldingly clamped against the work by screwing the nuts 57 home. This yieldable mounting of the work on the table is particularly desirable, due to the fact that the metal doors or the like have a tendency to expand in the hot solder. Obviously, any equivalent work-clamping mechanism may be utilized.

The operation of the machine is substantially as follows. The door 46 is secured to the table by the clamping strips 59 while the table is in the horizontal dotted line position illustrated at A in Fig. 1. The table together with its supporting shaft 54, sleeve 53 and plate 48 are then turned about the pivot 49 until they assume the dotted line position illustrated at B in Fig. 1, the shaft 54 being of course slightly rotated to bring the corner of the door into position immediately over the acid pot 17. The elevation of the door corner above the acid pot may be conveniently controlled by adjusting the height of the standard 34, this adjustment being effected by rocking lever 40 and then tightening nut 38. When the door reaches the vertical position shown in Fig. 1, further swinging movement about the pivot 49 is of course prevented by the end of the slot 51.

Figure 3:
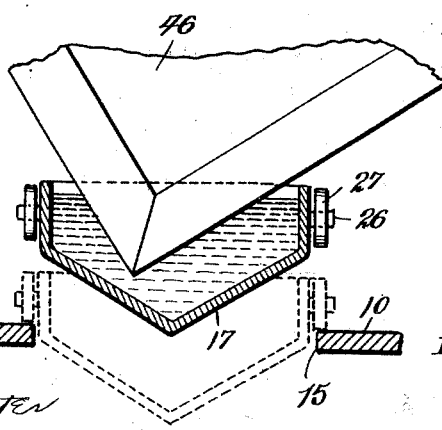
Fig. 3 is a fragmentary vertical sectional view through one of the pots showing a door corner immersed therein, and the dotted lines indicating the normal inactive position of the pot.

Assuming the door then, to be in the dotted line position B immediately above the acid pot 17, the treadle 32 is depressed to elevate the acid pot as shown in Fig. 3 and immerse the lower corner of the door in the acid. As the treadle 32 is released, the acid pot assumes its dotted line position of Fig. 3 and the door may be shifted over the solder pot by simply sliding the shaft 54 in its sleeve 53. The solder pot is then raised to immerse the door corner in the solder by depressing the pedal 25; Figure 1 indicating in dotted lines the operative position of the solder pot.

Assuming the door to be centrally clamped relatively to the supporting table, a new door corner may be brought into position for soldering by simply rotating the shaft 54 in its bearing sleeve; the pots 16 and 17 during such rotation being in the full line position of Fig. 1, and entirely out of the path of the door.

While I have arbitrarily described the pot 16 as a solder pot, the pot 17 as an acid pot, it will be apparent that the position or the function of these members might be reversed.

It is also to be understood that while I have shown a door 46 having corner joints to be soldered, the soldering machine might handle a wide and varied range of work within the scope of the present invention. Due to the vertical adjustment of the standard, the pivotal adjustment of the plate 48 and the slidable and rotatable adjustment of the shaft 54, the work may be very conveniently manipulated to bring it into various positions where it may be most effectively treated. The counter balances 33 and 44 render the manipulation of the standard 34 and the solder pot an easy one, and much of the arduous labor now involved in handling the work to be soldered is avoided.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. A machine of the class described including a base and a frame rising therefrom, a solder pot mounted in the base, a work holder adjustably mounted on the frame, and means for elevating the pot to immerse part of an article secured on the work holder, said work holder being rotatably adjustable, whereby to present several corners of an article to be soldered in position for coaction with the pot.

2. A machine of the class described including a base and a frame rising therefrom, a solder pot mounted in the base, a work holder adjustably mounted on the frame, and means for elevating the pot to immerse part of an article secured on the work holder, said work holder being tiltable from a horizontal position to a vertical position, whereby an article may be secured horizontally to the work holder and then moved with the work holder to vertical position.

3. A machine of the class described including a base and a frame rising therefrom, a solder pot mounted in the base, a work holder adjustably mounted on the frame, and means for elevating the pot to immerse part of an article secured on the work holder, means for vertically adjusting the work holder, and means for rotating the work holder.

4. A machine of the class described including a base and a frame rising therefrom, a solder pot mounted in the base, a work holder adjustably mounted on the frame, means for elevating the pot to immerse part of an article secured on the work holder, means for vertically adjusting the work holder, and means for rotating the work holder, all of said means being operable independently of each other.

5. A machine of the class described including a base and a frame rising therefrom, a solder pot mounted in the base, a work holder adjustably mounted on the frame, and means for elevating the pot to immerse part of an article secured on the work holder, the work holder comprising a table upon which work is to be secured, and a supporting shaft rigidly fixed to said table, means for axially shifting the shaft relatively to the frame and for rotating the shaft in the frame.

6. A machine of the class described including a base and a frame rising therefrom, a solder pot mounted in the base, a work holder adjustably mounted on the frame, means for elevating the pot to immerse part of an article secured on the work holder, the work holder comprising a table upon which work is to be secured, a supporting shaft rigidly fixed to said table, means for axially shifting the shaft relatively to the frame and for rotating the shaft in the frame, and means for tilting the shaft, shaft supporting means and work holder relatively to the frame.

7. A machine of the class described including a base and a frame rising therefrom, a solder pot mounted in the base, a work holder adjustably mounted on the frame, means for elevating the pot to immerse part of an article secured on the work holder, the work holder comprising a table upon which work is to be secured, a supporting shaft rigidly fixed to said table, means for axially shifting the shaft relatively to the frame and for rotating the shaft in the frame, means for tilting the shaft, shaft supporting means and work holder relatively to the frame, and means for bodily elevating the shaft, shaft-supporting means and work holder relatively to the frame.

Signed at Long Island City, in the county of Queens and State of New York, this 16th day of March, A. D. 1928.

LOUIS LIEBMAN.